(12) United States Patent
Camy-Peyret et al.

(10) Patent No.: US 10,711,996 B2
(45) Date of Patent: Jul. 14, 2020

(54) APPARATUS FOR ENDOTHERMIC PROCESS WITH IMPROVED BURNERS ARRANGEMENT

(71) Applicant: L'Air Liquide, Societe Anonyme pour l'Etude et l'Exploitation des Procedes Georges Claude, Paris (FR)

(72) Inventors: Frederic Camy-Peyret, Paris (FR); Julien Cances, Indre (FR); Diana Tudorache, Bures sur Yvette (FR)

(73) Assignee: L'Air Liquide Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 60 days.

(21) Appl. No.: 16/061,865

(22) PCT Filed: Nov. 17, 2016

(86) PCT No.: PCT/EP2016/077960
§ 371 (c)(1),
(2) Date: Jun. 13, 2018

(87) PCT Pub. No.: WO2017/102234
PCT Pub. Date: Jun. 22, 2017

(65) Prior Publication Data
US 2018/0372310 A1      Dec. 27, 2018

(30) Foreign Application Priority Data
Dec. 15, 2015   (EP) .................................... 15307007

(51) Int. Cl.
F23C 5/08        (2006.01)
F23D 14/84       (2006.01)
(Continued)

(52) U.S. Cl.
CPC ............... *F23C 5/08* (2013.01); *F23C 13/00* (2013.01); *F23C 13/06* (2013.01); *F23D 14/84* (2013.01);
(Continued)

(58) Field of Classification Search
CPC ....................................................... F23C 5/08
See application file for complete search history.

(56) References Cited

U.S. PATENT DOCUMENTS

| 7,686,611 B2 | 3/2010 | Joshi et al. |
| 2007/0128091 A1 | 6/2007 | Gorval |

(Continued)

FOREIGN PATENT DOCUMENTS

| EP | 2 325 562 | 5/2011 |
| EP | 2 369 229 | 9/2011 |

(Continued)

OTHER PUBLICATIONS

International Search Report and Written Opinion for PCT/EP2016/077960, dated Feb. 2, 2017.
EP Search Report for EP15307007, dated Jun. 13, 2016.

*Primary Examiner* — Douglas B Call
(74) *Attorney, Agent, or Firm* — Justin K. Murray

(57) ABSTRACT

A furnace for performing an endothermic process comprising tubes containing a catalyst for converting a gaseous feed, wherein tubes are positioned in rows inside the furnace, wherein burners are mounted between the tubes and between the tubes and the furnace walls parallel to the tubes row and wherein the burners rows and the tubes rows are ended by end walls and are divided into sections with the distance from the end burner to the end wall being B2W, the distance between two adjacent burners in the section being B2B, and half the distance in-between two sections being B2S, wherein the burners in the rows are arranged in such a way that the ratios B2B/B2W and B2B/B2S are greater than 1.3

(Continued)

thus limiting the occurrence of the flame merging phenomenon and reducing significantly the quadratic mean of the tube temperature profile.

14 Claims, 9 Drawing Sheets

(51) Int. Cl.
    *F23C 13/06*     (2006.01)
    *F27B 17/00*     (2006.01)
    *F23C 13/00*     (2006.01)

(52) U.S. Cl.
    CPC .. *F27B 17/0016* (2013.01); *C01B 2203/0233* (2013.01); *F23C 2900/03002* (2013.01)

(56) References Cited

U.S. PATENT DOCUMENTS

| | | |
|---|---|---|
| 2011/0220847 A1 | 9/2011 | Hendershot et al. |
| 2012/0259147 A1 | 10/2012 | Payne |
| 2015/0217250 A1 | 8/2015 | Cances et al. |

FOREIGN PATENT DOCUMENTS

| | | | |
|---|---|---|---|
| EP | 2 708 812 | | 3/2014 |
| WO | WO 2014/040815 | * | 3/2014 |

* cited by examiner

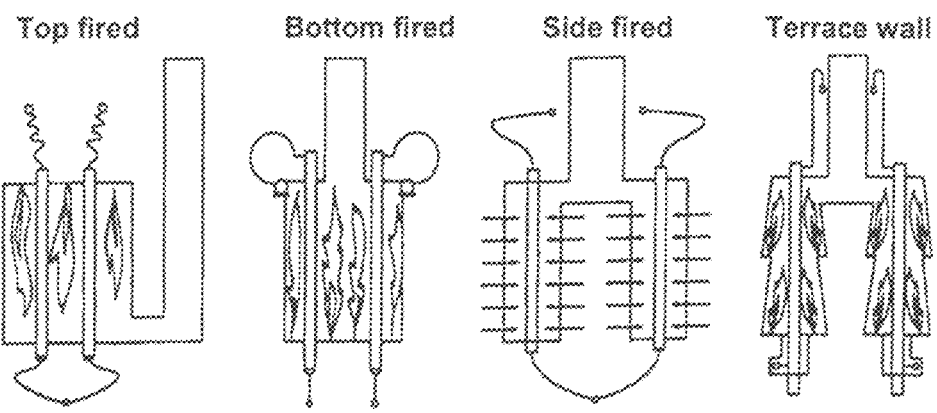
Figure 1
Figure 6
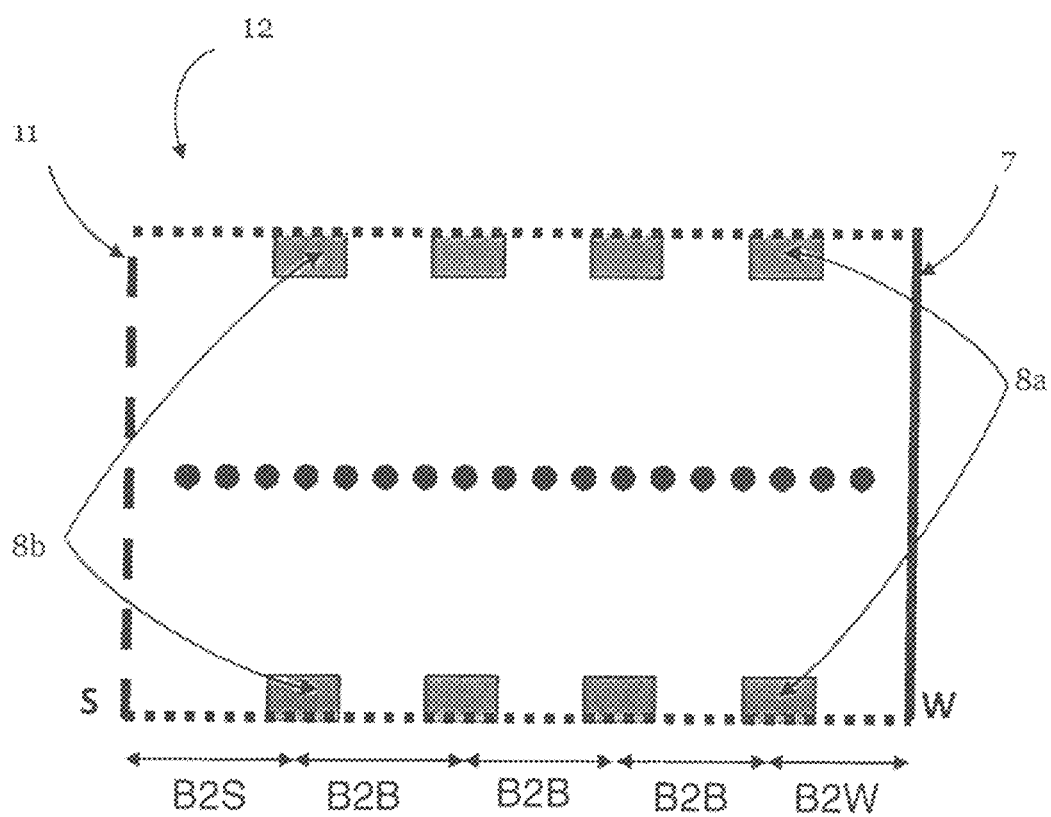

| Burner number per bay | Tube number per bay | B2B/B2W | B2B/B2S | RMS T [°C] |
|---|---|---|---|---|
| 4 | 15 | 2.00 | 2.00 | 1.26 |
| 4 | 15 | 1.99 | 1.99 | 1.32 |
| 5 | 17 | 2.00 | 2.00 | 1.61 |
| 5 | 16 | 2.00 | 2.00 | 1.99 |
| 4 | 15 | 1.84 | 1.99 | 1.93 |
| 5 | 18 | 1.99 | 2.00 | 2.13 |
| 5 | 16 | 1.60 | 1.60 | 2.26 |
| 4 | 16 | 1.60 | 1.60 | 2.42 |
| 5 | 16 | 1.40 | 1.40 | 3.39 |
| 4 | 15 | 1.50 | 2.00 | 4.73 |
| 5 | 16 | 1.10 | 1.10 | 5.17 |
| 5 | 18 | 1.43 | 1.61 | 5.59 |
| 4 | 18 | 1.13 | 1.23 | 9.55 |
| 5 | 18 | 1.02 | 1.12 | 10.86 |

Figure 10

APPARATUS FOR ENDOTHERMIC PROCESS WITH IMPROVED BURNERS ARRANGEMENT

CROSS REFERENCE TO RELATED APPLICATIONS

This application is a § 371 of International PCT Application PCT/EP2016/077960, filed Nov. 17, 2016, which claims the benefit of EP15307007.3, filed Dec. 15, 2015, both of which are herein incorporated by reference in their entireties.

FIELD OF THE INVENTION

The present invention relates to the design of top-fired or bottom-fired furnaces for steam methane reforming (SMR) and other endothermic reactions like hydrocarbon feedstock cracking in externally fired reactors.

BACKGROUND

The SMR process is mainly based on the reforming reaction of light hydrocarbons such as methane that yields to a mixture of hydrogen ($H_2$) and carbon monoxide (CO) in the presence of water vapor. The reaction is endothermic and slow and requires additional heat input, as well as a catalyst to occur. Usually, SMR reactor performances are limited by the heat transfer and not by the kinetic of the reactions.

In industrial practice, the SMR reactor usually comprises tubes placed in a furnace, said tubes being filled with catalyst—usually in the form of pellets—and fed with the process gas mixture of methane and steam.

Several well-proven configurations are available for furnace design as illustrated by FIG. 1 which presents top fired (also known as down fired), bottom fired (also known as up fired), side fired, and terrace wall.

The top-fired technology is one of the most referenced designs and it is proposed by several technology providers. Top-fired furnaces are typically made of a refractory lined firebox containing several rows of catalyst containing tubes. The necessary heat for the endothermic reaction to occur is provided by roof burners placed in rows between the tubes, and also by rows of additional roof burners at the furnace side, along the walls of the furnace. The combustion products out of the burners are usually blown vertically downwards, so that the tube rows face the flames in their upper part. A flue gases exhaust collector is usually provided at the furnace floor level.

The bottom fired technology is less common in modern plants. According to the bottom fired technology, the burners are arranged in row on the floor of the firing area between the tube rows and fire vertically upwards. This type of reformer has an almost constant heat flux profile along the tube.

The main objective of the furnace design (also called firebox design) is to maximize the heat transferred from the burners to the tubes—from the burner flames and also from the walls and the hot flue gas while respecting a tube maximal operating temperature constraint. The tube maximal operating temperature or MOT (also known as maximal operating constraint or MOT) is a function of several factors, and particularly of the tube mechanical load (mainly feed gas pressure), of the mechanical properties of the alloys used for the tubes and of the desired lifetime of the tubes exposed to creep and thermal aging.

Any intensification of the heat transferred to the tubes has a direct positive impact, either by increasing the productivity or by improving the compactness of the firebox which is valuable in terms of capital expenditures. However, intensification of the heat transferred usually implies higher tube skin temperature levels that reduce tube lifetime or require more resistant alloys, which are much more expensive.

Lack of homogeneity in the heat duty distribution in the furnace will lead some of the tubes to be hotter than other, that's why temperature profiles of tubes are critical elements for the furnace design and during operation. Tube temperature profiles provide decisive information when looking for good compromise between performance and durability; a good compromise is actually essential.

During operations, the performances of the furnace are therefore limited by the temperature of the hottest tube; it should not be hotter than the MOT. In the meantime, the process performance, i.e. the productivity or efficiency of conversion, depends on the average tubes heat flux and temperatures. Therefore, the smaller the difference between the hottest tube temperature and the average tube temperature; the better the furnace performance.

Seeking for simplicity, most of the explanations that follow are made with regards to a top fired furnace. However, it is to be noted that most of the figures and explanations apply as well to bottom fired furnaces.

In such a furnace, the catalyst tubes are arranged in rows within the furnace. The feed is supplied through the top part of the tubes; the synthesis gas produced containing hydrogen and carbon monoxide as major components, and residuals, is withdrawn at the bottom part of the tubes. Burners are arranged in rows between the tubes rows and between tubes and walls. Resulting flue gases are extracted through exhaust tunnels.

The large number of tubes and burners make it necessary to add roof beams to support the structure and to ensure safety of the furnace; said supports beams divide the rows in several parts (also known as sections or bays).

FIG. 3 presents a top view of a top-fired furnace with eight rows of 54 tubes each being organized in three sections (or bays) of 18 tubes each—and nine rows of 12 burners arranged also in three sections of four burners each, and parallel to the tubes rows. The rows of burners are ended by a wall (wall along Y axis also identified as "end walls"). For all rows of burners, the end burners facing the end wall are identified as "wall end burners".

The sections are ended either by an end wall or by a symmetry plane separating two adjacent sections. The end burners closest to the symmetry planes are identified as "symmetry end burners". This division in sections induces dissimilar boundary conditions for the flame jets leading to merging of the jets towards the center of the sections.

In all the description the expression "row of burners" is to be understood as "row of burners parallel to the tube rows", the direction of the rows being also identified as X axis; rows of burners that are perpendicular to the tube rows (along Y axis) will be explicitly identified when necessary as "row of burners perpendicular to the tube rows" or "row parallel to Y axis".

In the furnaces concerned by the invention where burners are placed in rows parallel to the tube rows, for each burner, the direction of the flame jet created by the burner is affected by the interaction with nearby coflowing jets and by the presence of wall (if any).

Hereafter, only the flame jets interaction within a row of burners parallel to the tube rows (along X axis) will be treated by this invention. It is to be noted that all the burners of a row parallel to the tube rows are operated at the same power, which is not the case for the burners of a row perpendicular to the tube rows.

Prior art, and in particular U.S. Pat. No. 7,686,611, US 2011/0220847, US 2007/0128091, US 2015/0217250 have already considered the case of flame jets interaction within a row of burners perpendicular to the tube rows (along Y axis), and the problems that are specific to this direction are therefore not considered in this invention.

However, the problem of the jet flames interaction within a row of burners parallel to tubes rows generates also problems that have not been solved by the prior art, and this invention aims at focusing on the behavior of the burners in rows along X-axis and aims at improving it; more specifically the invention aims at bringing a solution to the lack of homogeneity of the tubes heating along X axis.

Considering now the flame jet exiting a wall end burner; it behaves like a jet of fluid: the flame jet overlooking an adjacent jet flame has to spray through an external stream of fluid flowing in the same direction; on the other hand, the jet flame overlooking an end wall has necessarily its local velocity near the end wall equal to zero. These dissimilar boundary conditions induce a flame jet deflection with respect to the jet axis.

In addition, a high number of tubes and/or burners in each row induces geometrical constraints in the furnace that makes it necessary to add support beams to ensure safety of the furnace; said supports therefore take place in voids (or spaces) that divide the rows in several sections periodically repeated. This division induces additional dissimilar boundary conditions that impact the jet flame, leading to velocity variations across the axis of the jet of the symmetry end burners, which are the closest to the said supports.

This means that the jet flames generated by different burners in a row are submitted to different influences depending on their location in the row, and consequently the tubes receive variable amount of heat depending on their position in the row.

To illustrate this phenomenon, numerical simulations have been made using a 3-D Computational Fluid Dynamic (CFD) solver intended for calculation of the heat transfer between the combustion chamber and the tubular catalytic reactors.

With this aim, top-fired SMR furnace "representative bays" are defined; the "representative bays" defined would have to be "representative" of repeated sections (or bays) described above, and also have to take into account the presence of the walls or of the symmetry planes. The modular standard reformer would then be composed of an assembly of a number of representative bays to achieve the desired plant capacity.

Depending on the number of tubes and burners in the rows and/or additional geometrical constraints, different type of "representative bays" can exist with various numbers of burners and tubes. However, it is to be noted that the invention applies to all types of sections in terms of number of burners, or in term of number of tubes or in term of end-type of the section (either end wall or void separating adjacent sections).

Such representative bays are shown on FIG. 4. For sake of simplicity, the explanations that follow are made with regards to a representative bay composed of a subset of eighteen tubes heated by two rows of four burners of same power, with a end wall at one end of the bay and a symmetry plane at the second end of the bay.

FIG. 5a illustrates the jet flame merging effect due to the deflection of the flame jets close to the wall and to the void separating adjacent sections.

The merging of the jet flames towards the middle of the bay induces an inhomogeneous heat transfer to the reforming tubes; the tubes in the middle of the representative bay reach a higher skin-temperature as shown by the 3-D CFD results on FIG. 5b. In the case presented, the difference between the maximum skin temperature value and the minimum skin temperature value within the representative bay reaches 30° C.

There is, therefore, a problem of lack of homogeneity in the heating along a tube row, and certain embodiments of the invention aim at solving this problem of control of heat flux homogeneity in top fired SMR (and bottom fired as well) by limiting the jet flame merging along the tube rows.

SUMMARY OF THE INVENTION

The inventors have found that the way the burners are arranged in a row, several distances between burners, end walls and symmetry planes, and more exactly some specific distance ratios are very important to avoid the merging of the flame jets. Those distances of interest are presented on FIG. 6; this figure shows the same representative bay as in FIG. 4 with eighteen aligned tubes flanked by two rows of four burners. On the figure are also indicated the distances that have been found to be key parameters, which are the following:
  B2B is the distance between two adjacent burners in the bay;
  B2W is the distance between the end burner and the end wall;
  B2S is the distance between the burner close to the symmetries void—i.e. adjacent to another bay—and the symmetry plane, middle of the void between two adjacent bays, thus B2S is half the distance in-between two sections.

The ratios that the inventors consider as decisive are B2B/B2S and B2B/B2W.

It is an aim of the present invention to limit the flame merging phenomenon along the burners rows.

It is a further aim of the invention to reduce the range of tube temperatures along the rows of tubes heated by said burners rows.

The present invention proposes to achieve said aims thanks to a furnace and a method to design this furnace which will avoid the flame jets merging occurrence as well as the problem of overheating of the tubes, by means of an optimized arrangement of the burners along the burner rows.

It is therefore an object of certain embodiments of the invention to propose a furnace for performing an endothermic process comprising tubes containing a catalyst for converting a gaseous feed, wherein tubes are positioned in rows inside the furnace, wherein burners are mounted between the tubes and between the tubes and the furnace walls parallel to the tubes row, and wherein the burners rows and the tubes rows are ended by end walls and are divided into sections with the distance from the end burner to the end wall being B2W, the distance between two adjacent burners in the section being B2B, and half the distance in-between two sections being B2S, wherein the burners in the rows are arranged in such a way that the ratios B2B/B2W and B2B/B2S are greater than 1.3 thus limiting the occurrence of the flame merging phenomenon and reducing significantly the quadratic mean of the tube temperature profile.

In a preferred furnace of the invention, the ratios B2B/B2W and B2B/B2S are greater than 1.6 and preferably greater than 1.8 thus leading to additional improvement in the quadratic mean of the tube temperature profile.

In this connection, it is more preferable that B2B/B2W and B2B/B2S are equals and greater than 1.6 and preferably equals and greater than 1.8.

The invention is particularly suitable for furnace with burners mounted to the furnace roof.

According to another embodiment, burners are mounted to the floor and fire vertically upwards.

The reformer of the invention is advantageously a steam methane reformer furnace.

According to another aspect, the invention relates to an endothermic process to be performed in a furnace comprising tubes and burners, said process comprising:
  introducing gaseous feed and steam to tubes containing a catalyst for converting a gaseous feed, wherein tubes are positioned in rows inside the furnace,
  combusting fuel with air in burners that are mounted between the tubes and between the tubes and the furnace walls parallel to the tubes row,
  discharging products generated at the lower end of the tubes, wherein the burners rows and the tubes rows are ended by end walls and are divided into sections with the distance from the end burner to the end wall being B2W, the distance between two adjacent burners in the section being B2B, and half the distance in-between two sections being B2S, characterized in that the burners in the rows are arranged in such a way that the ratios B2B/B2W and B2B/B2S are greater than 1.3 thus limiting the occurrence of the flame merging phenomenon and reducing significantly the quadratic mean of the tube temperature profile.

In addition, the process of the invention can be—taken alone or in combination:
  a process for steam methane reforming;
  a process according to claim 8 wherein the ratios B2B/B2W and B2B/B2S are greater than 1.6 and preferably greater than 1.8;
  a process according to claim 9 where the ratios B2B/B2W and B2B/B2S are equal;
  a process according to claims 7 to 10 wherein the furnace is a top fired furnace;
  a process according to claims 7 to 10 to be performed in a bottom fired furnace.

BRIEF DESCRIPTION OF THE DRAWINGS

The furnace of the present invention and its advantages will be described in more detail in the following examples and on the basis of the drawings, where:

FIG. 1 shows the burners configuration for typical furnace designs;

FIG. 5b shows the maximum tube skin temperature profile for the 18 tubes of the same representative bay as FIG. 5a;

FIG. 6 shows the key parameters—according to the invention—for the repartition of burners in the representative bay of FIG. 5a and FIG. 5b;

FIG. 10 presents a table giving the root mean square of the tubes temperature obtained from simulations applied to a range of representative bays

DETAILED DESCRIPTION OF THE INVENTION

As stated above, the invention aims at proposing an improved design of a furnace of top-fired or bottom-fired type—such furnaces are illustrated on FIG. 1—for performing an endothermic process; the objective is to mitigate the temperature variations along a row of burners parallel to the rows of tubes—along X-axis—having the same power thanks to an improved repartition of the burners along said row.

In order to be able to identify and propose the best arrangements of burners along a row, numerical simulations have been performed for different arrangements of the burners—having the same power—along a row of burners, for several SMR plants.

The tool used to identify the best repartitions of the burners in "representative bay" is the tool used here above for putting forward the lack of homogeneity of the flame jets and tube temperatures resulting from existing designs.

The numerical simulations are made on top-fired SMR representative bays using a 3-D Computational Fluid Dynamic (CFD) solver intended for calculation of the heat transfer between the combustion chamber and the tubular catalytic reactors.

For a given furnace, representative bays are chosen; the representative bays defined would have to be representative of repeated sections, and also have to take into account the presence of the walls and also the voids between sections for furnaces with two sections or more. The modular standard reformer with the desired capacity would then be composed by assembling a suitable number of representative bays.

Reading the following more detailed description of the figures will help understanding the invention.

Figure 2:
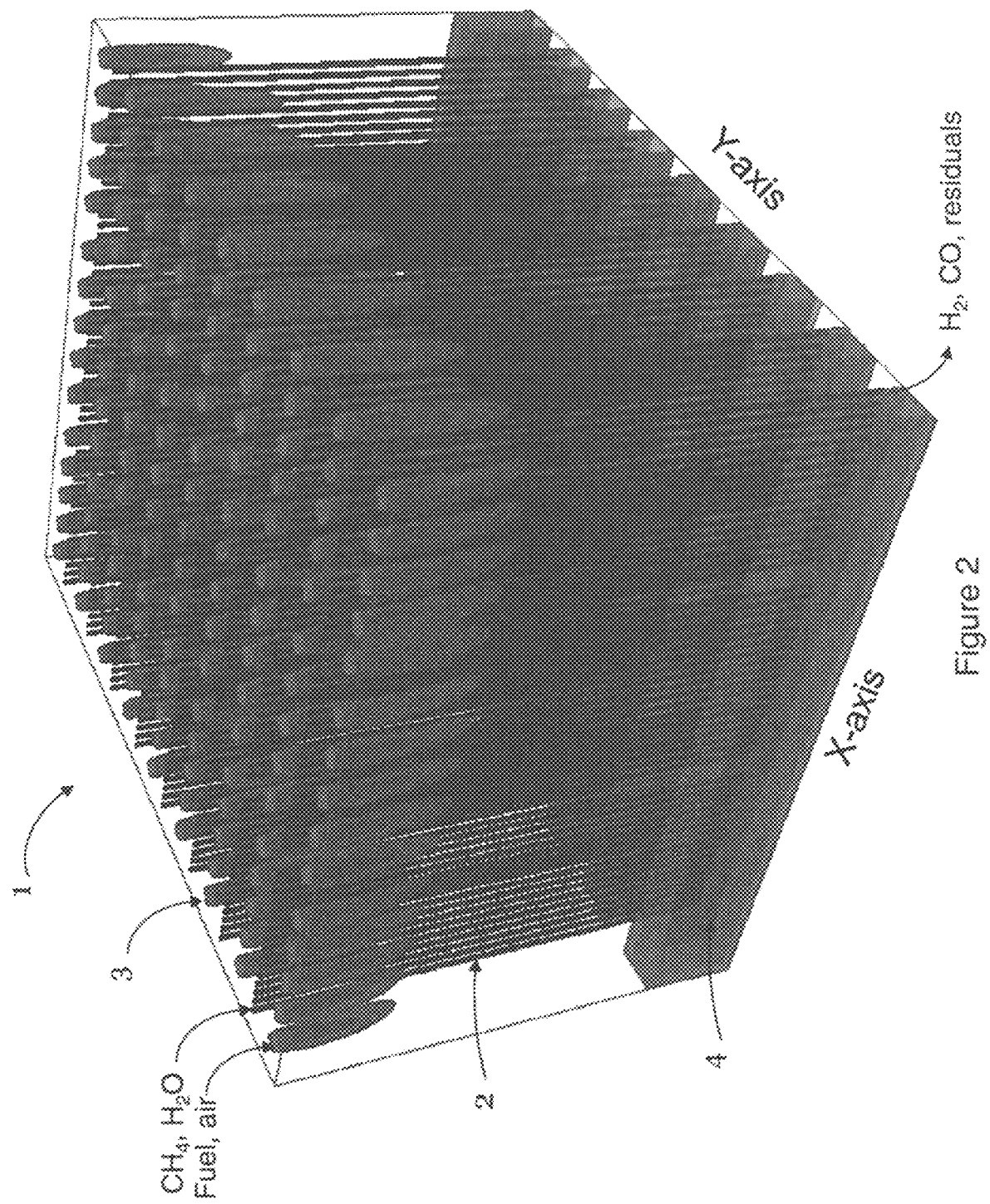
FIG. 2 shows a typical arrangement using a 3D representation of a top-fired furnace used for syngas synthesis.

FIG. 2 is a 3-D perspective view of a furnace; more exactly, it shows a typical arrangement of a top-fired furnace 1 used to produce a synthesis gas from a feed containing methane and steam. Catalyst tubes 2 are arranged in rows within the furnace 1. The feed is supplied through tubes 2 from the top to the bottom; the synthesis gas produced containing hydrogen and carbon monoxide as major components, and residuals, is withdrawn from the bottom part of the tubes 2. Burners 3 are arranged in rows between the tubes rows and between tubes rows and the walls along X axis. Resulting flue gases are withdrawn through exhaust tunnels 4.

Figure 3:
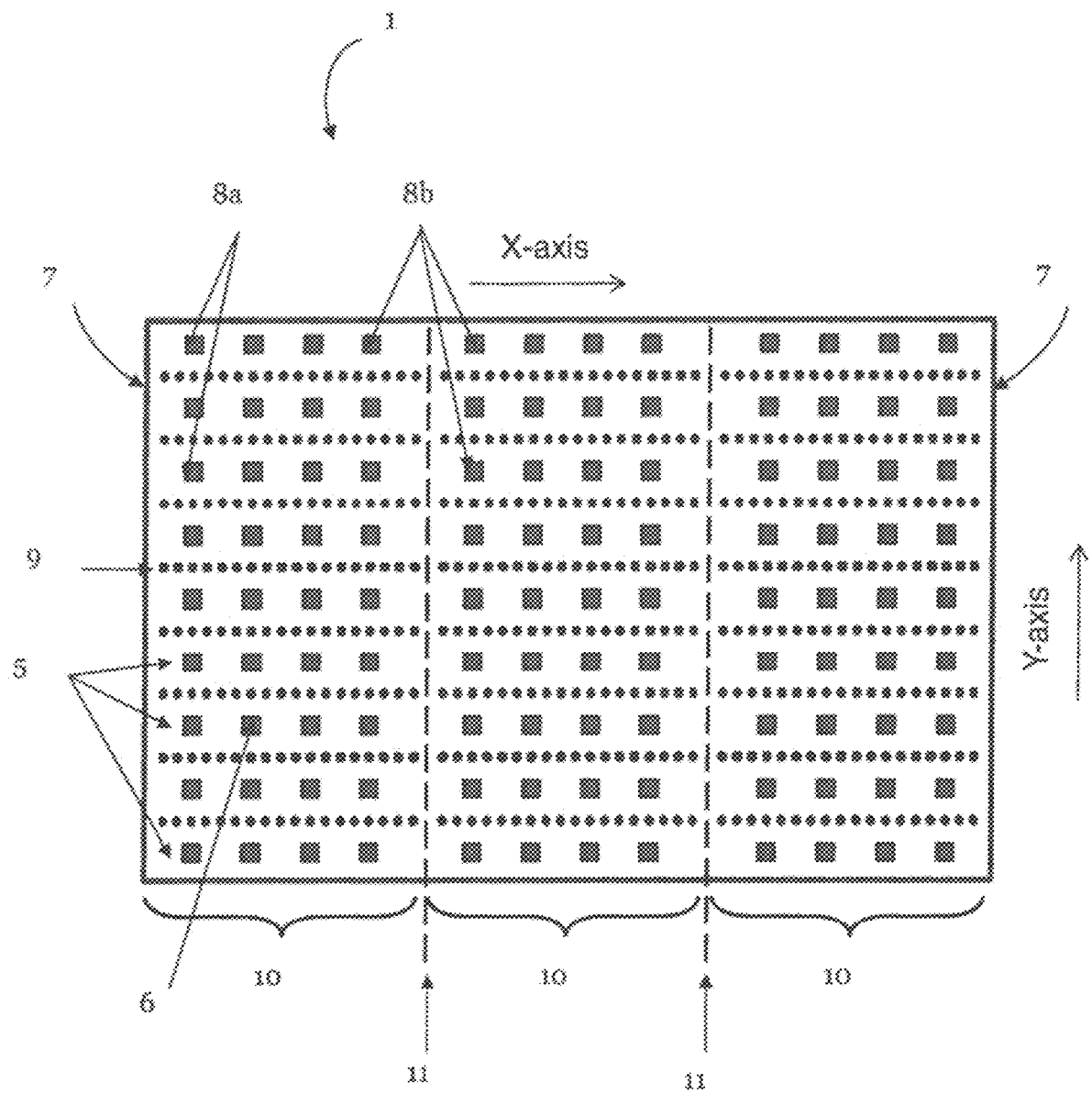
FIG. 3 shows a top view of a top-fired furnace, highlighting tubes and burners organization.

FIG. 3 presents a top view of a top-fired furnace 1 with 8 rows 9 of 54 tubes, each row being arranged in 3 sections 10 of 18 tubes each—and 9 rows 5 of 12 burners 6 arranged in 3 sections 10 of 4 burners each, and parallel to the tubes rows. The rows 5 of burners 6 are ended by a wall 7 (wall along Y axis also identified as "end walls"). For all rows 5 of burners 6, the end burners 8*a* facing the wall 7 are identified as "wall end burners".

As already stated, an important number of tubes and burners make it necessary to add support beams to ensure safety of the furnace; said supports divide the rows in several parts (also known as sections or bays 10). The sections 10 end either by a wall 7 or by a symmetry plane 11 separating two adjacent sections. The end burners 8*b* closest to the symmetry planes 11 are identified as "symmetry end burners". This division in sections 10 induces dissimilar boundary conditions leading to merging of the flame jets towards the center of the sections.

Figure 4:
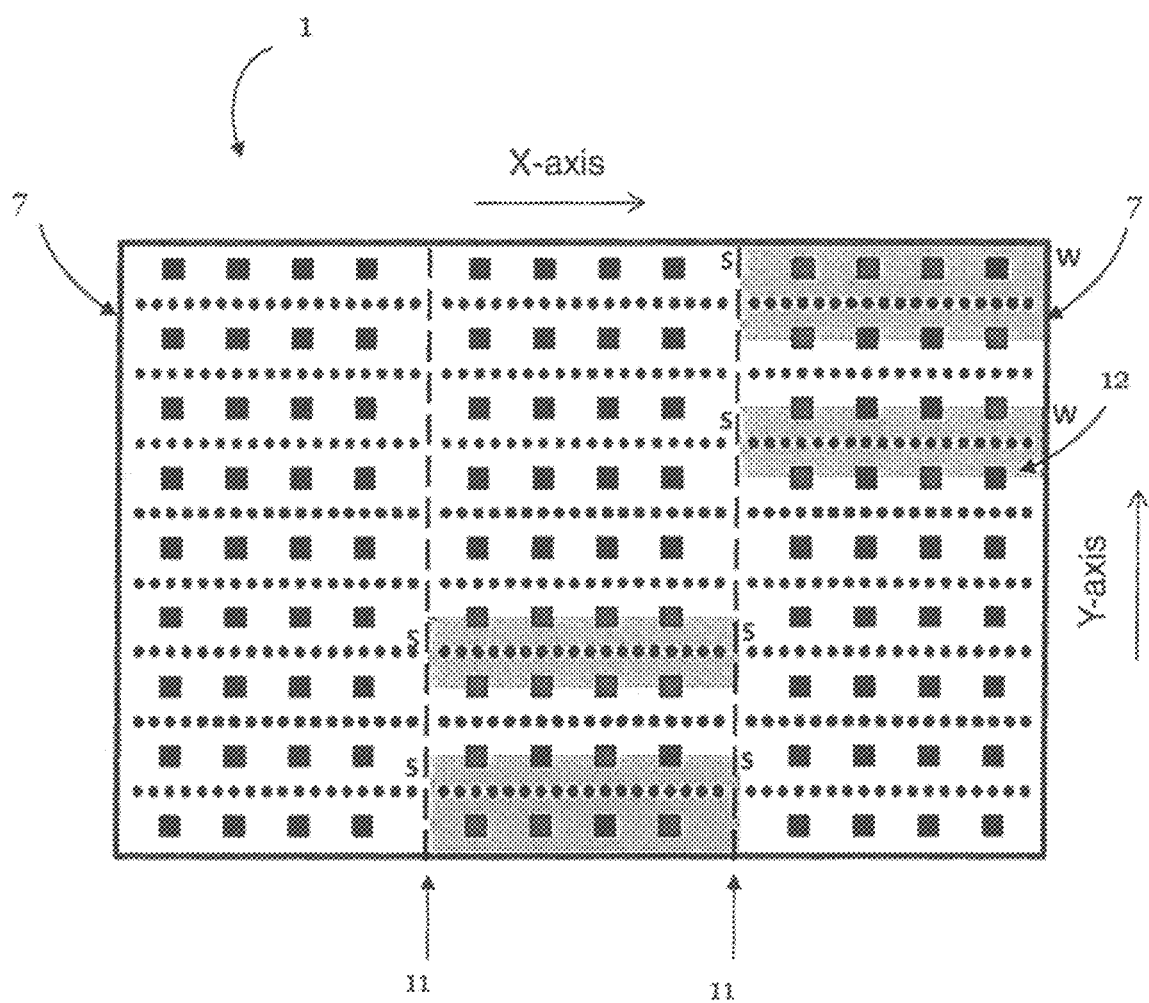
FIG. 4 shows a top view of the same furnace highlighting "representative bays" at the furnace scale.

FIG. 4 shows a top view of the furnace highlighting four representative bays at the furnace scale—see grey rectangles. The representative bay 12 is composed of a subset of 18 aligned tubes, heated by 2 rows of 4 burners of same power, one end W being a wall representative of end wall 7, and the second end S being representative of the symmetry plane 11 in the middle of the void between 2 sections 10. The configuration of the representative bay 12 will be used for the simulations intended to describe the invention and presented hereafter in relation with the figures.

Figure 5A:
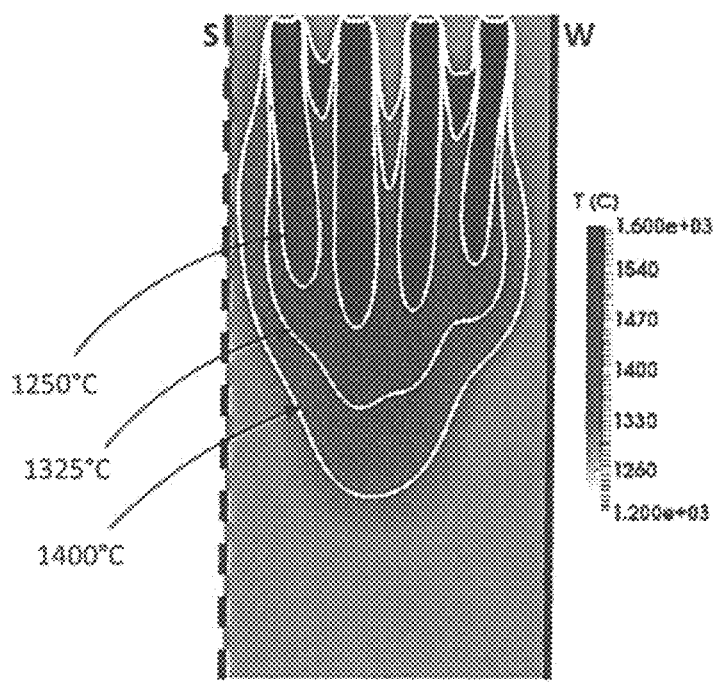
FIG. 5a shows the flame jets merging for a chosen "representative bay" (with 4 burners and 18 tubes)

FIG. 5*a* presents the temperature field in a plane cut in the middle of the burners. It results from the numerical simulation applied to the representative bay 12 of FIG. 4 with the burner arrangement characteristics B2B/B2W=1.1 and B2B/B2W=1.2; it illustrates the flame merging effect towards the center of the bay due to the deflection of the flame jets from end burners 8*a* close to a wall 7 and end burners 8*b* close to the symmetry plane 11.

Figure 5B:
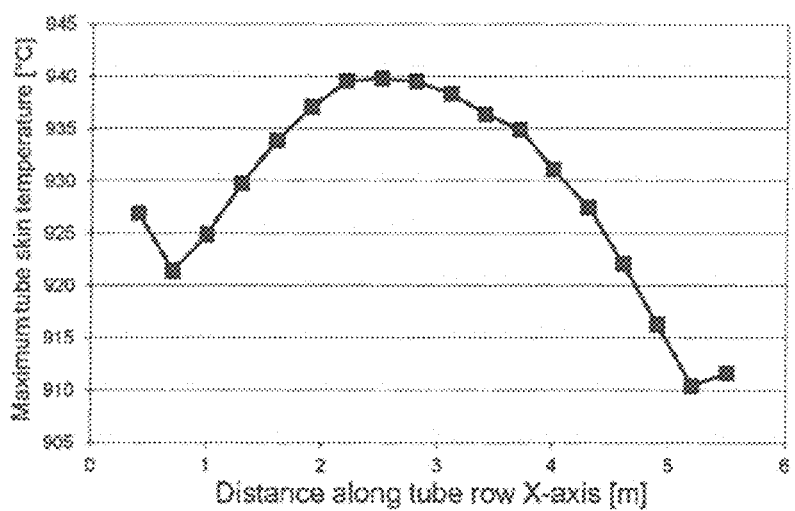

Due to this flame jets merging behavior, the heat transferred to the tubes lacks homogeneity, the tubes in the middle of the representative bay reach a higher skin-temperature as shown on FIG. 5*b* which presents the profile of the maximum tube temperature calculated thanks to the 3-D CFD model; this clearly illustrates that the heat transfer to the tubes is not homogeneous. A higher skin-temperature is observed for the tubes placed in the middle of the representative bay, the difference between the maximum and minimum skin temperature value within this representative bay reaching 30° C.

As stated above, the invention aims at controlling the heat flux inhomogeneities in a representative bay so as to consequently control the heat flux all along the row, and finally to improve the heat flux control in the whole furnace. To achieve this result, the invention aims at limiting the flame jets merging thanks to an improved burners arrangement design along rows of burners of same power.

In order to optimize the arrangements of the burners, numerical simulations of the behavior of different SMR plants have been performed.

As already stated, the arrangement of the burners along a row can be defined by the three distances (in meter) B2B, B2W and B2S. Identified on FIG. 6, the distances correspond to the following:

B2B is the distance between two adjacent burners in the representative bay;
B2W is the distance between the end wall 7 and the burner 8*a* in the representative bay;
B2S is the distance between the symmetry plane 11 and the burner 8*b* in the representative bay;

The three distances listed above have been identified as being of great importance and representative of the row, more precisely in the form of the two ratios B2B/B2S and B2B/B2W.

Remark: depending on its dimension and geometry, a furnace can be "represented" by different 'representative bays—as can be deduced from FIG. 4; a bay can be characterized by a pair of the following ratios:
(B2B/B2W and B2B/B2S) for a bay close to an end wall 7 on one end and a symmetry plane on the other end.
(B2B/B2S and B2B/B2S) for a middle section with symmetry planes 11 on both ends
(B2B/B2W and B2B/B2W) for a section with end walls 7 on both ends in the case of a small reformer with only one section.

The three following figures present the different repartitions of the burners for the representative bay 12 to which simulations have been applied and the results obtained.

Figure 7:
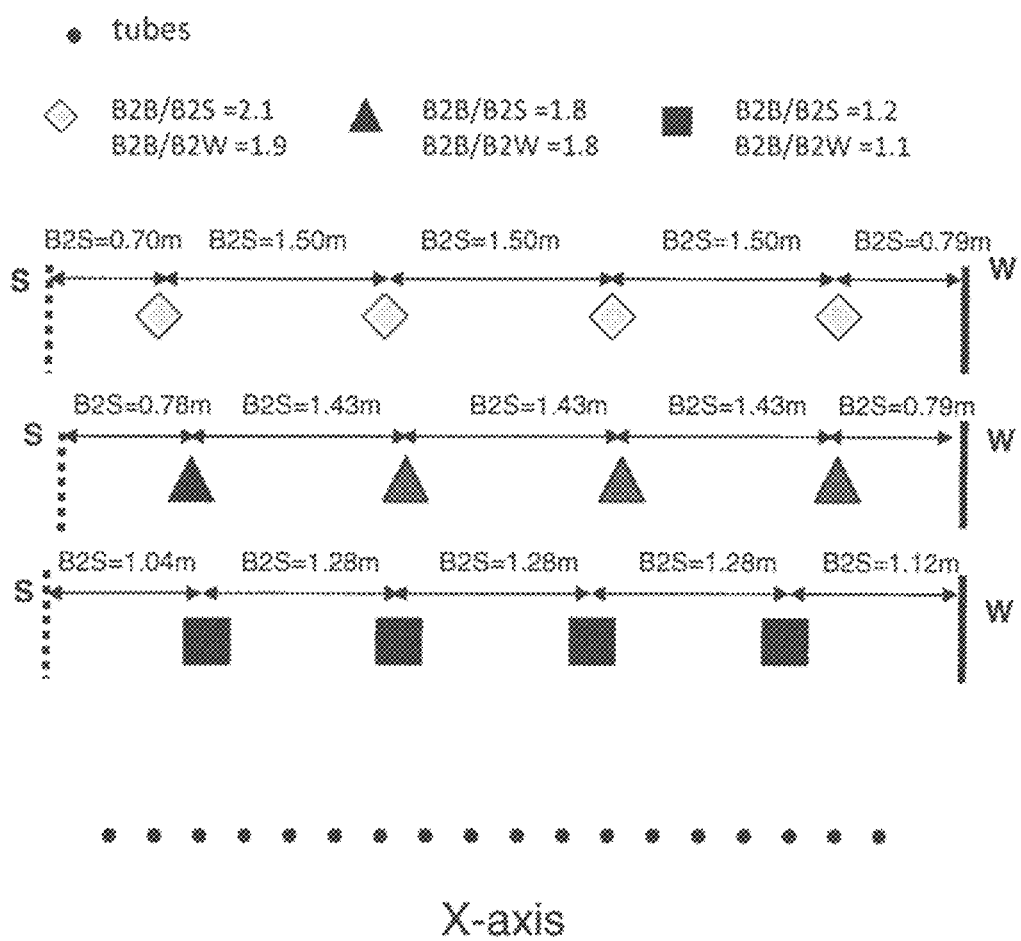
FIG. 7 presents 3 different repartitions of the burners in the representative bay of FIG. 6.

FIG. 7 shows 3 different repartitions of the 4 burners of the bay 12 of FIG. 6; for each case, the two ratios B2B/B2S and B2B/B2W are indicated and the burners are represented as lozenge, triangle or square according to the repartition. The same shapes will be used to differentiate the 3 cases in the following related figures. For the three cases, the repartition of the 18 tubes remains sensibly the same.

Figure 8:
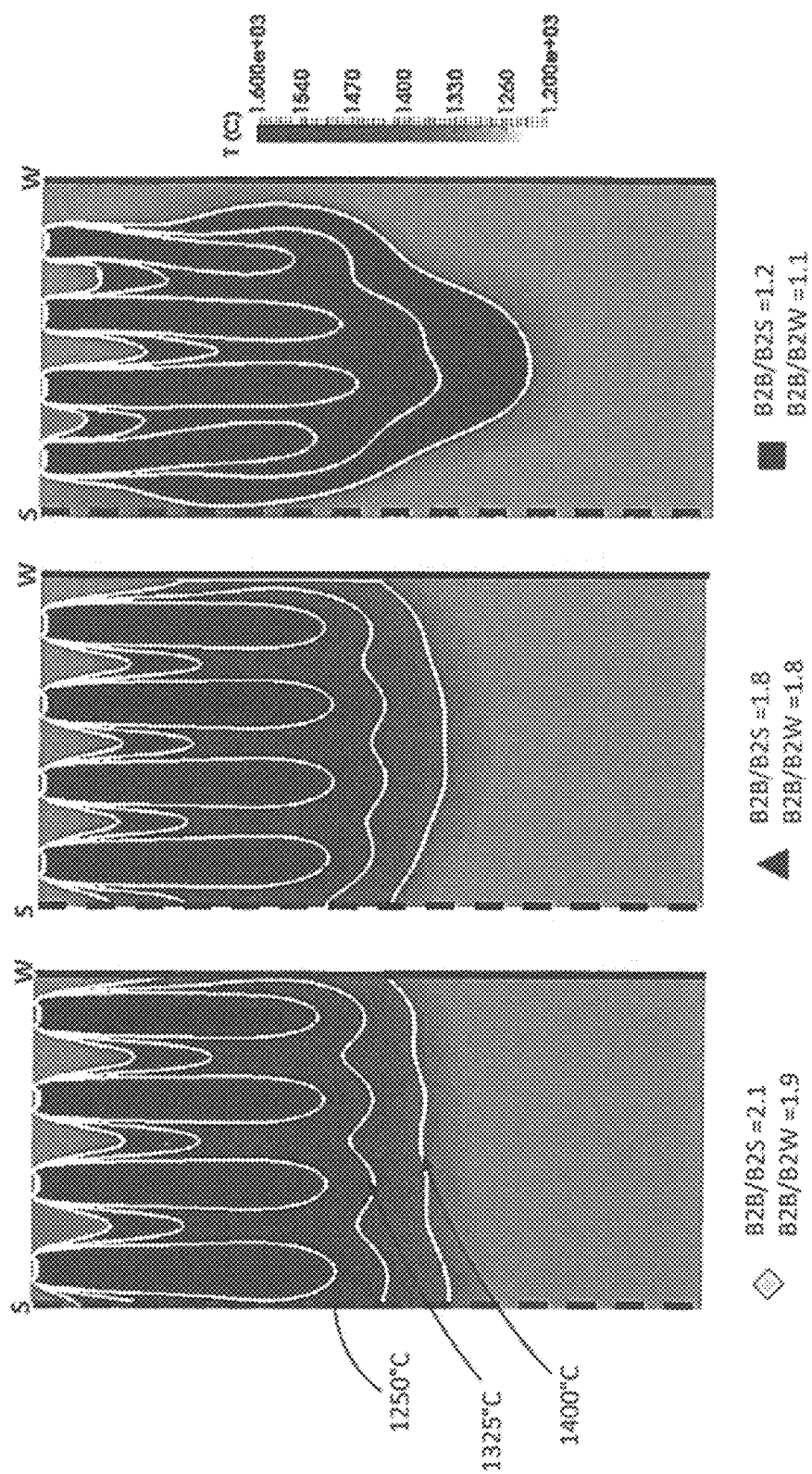
FIG. 8 illustrates the flame jets behaviour for the 3 cases presented on FIG. 7.

FIG. 8 shows the temperature field in a plane cut through the middle of the burners for the same 3 cases.

The numerical simulation results highlight that the flame jets from the end burners 8*a* and 8*b* are more or less deflected, depending on the repartition of the burners. The more regular shape is observed for the triangle referenced case with the ratios B2B/B2S=B2B/B2W=1.8; the maximum merging effect is observed for the square referenced case with B2B/B2S=1.2 and B2B/B2W=1.1, with the flame jets of end burners deflected toward the middle of the bay; the lozenge referenced case with B2B/B2S=2.1 and B2B/B2W=1.9 being intermediate with slightly visible deflection effect toward the adjacent bay increasing the fluid temperature close to the symmetry side.

Figure 9:
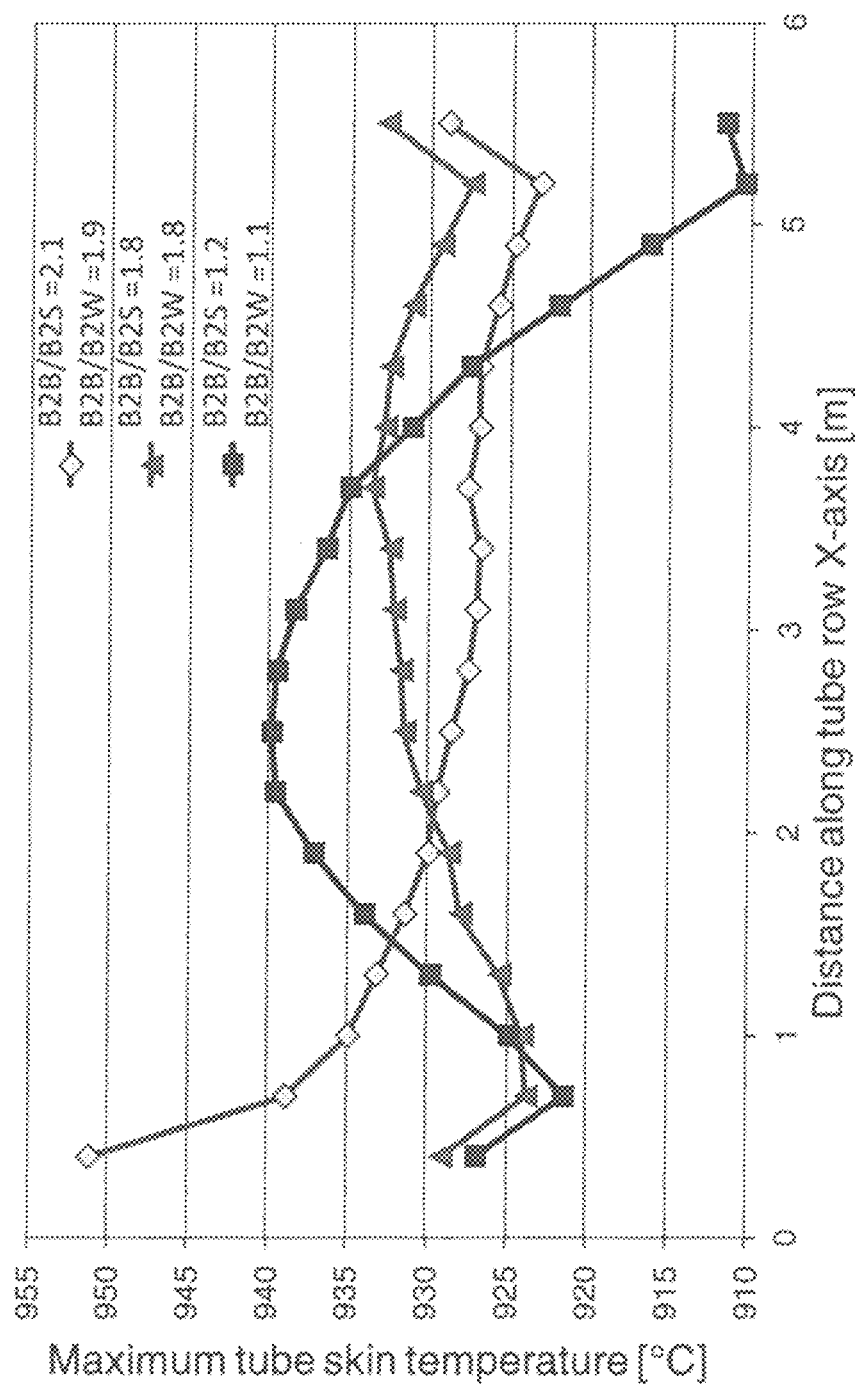
FIG. 9 shows the maximum tube skin temperatures for the 18 tubes of the representative bay for the same 3 cases presented on FIG. 8.

FIG. 9 shows the maximum tube skin temperature profile along a tube row for the same 3 cases. The comparison of the three profiles confirms the observations made on the flame shapes: triangle referenced tubes temperature profile is the more uniform and regular with a temperature spread between the hottest and coldest tube of around 10° C., while lozenge referenced tubes temperature profile is regular (no maximum in the center of the bay) but not uniform (temperature appears globally higher on the symmetry side than on the wall side) due to unequal ratios B2B/B2S=2.1 and B2B/B2W=1.9 leading to a temperature spread of 28° C., and square referenced tubes temperature profile presents an outstanding parabola shape profile with a maximum in the center of the bay and the highest temperature spread of 30° C.

To retrieve general design rules, a parametric study has been performed on 14 examples of reference bays with different values for the B2B, B2S and B2W distances, and various numbers of tubes and burners so as to represent a large variety of possible designs. This study allowed identifying the best ratios B2B/B2W and B2B/B2S, leading thus to define the best design rules, thanks to this study, it has been also to estimate the gain in term of temperature homogenization among the tubes.

FIG. 10 presents a table that summarizes the study presented here above, with the impact of the burner arrangement on the quadratic mean square (also known as root mean square RMS) of the tube temperature profile within different reference bays. The quadratic mean of the tube maximum temperature will quantify the dispersion of the tubes temperatures within a reference bay.

As the main objective of the invention is to solve the problem of non-uniformity of the temperatures along a row of tubes, this means that the best examples are those giving a RMS value as low as possible; in the examples presented, the highest RMS values are around 10, while the lower are close to 1° C. Such a low standard deviation (not far from 0) indicates that the tubes have similar temperatures while a high standard deviation—close to 10 or even more—indicates that the tube temperatures are spread out over a wider range of values. Thus, the lower the RMS of the tube maximum temperature in a bay, the better the performances of a steam methane reformer are.

Based upon the study performed, the hereafter burner ratio rules were defined:
 in order to have a RMS value lower than 5 the ratios B2B/B2W and B2B/B2S should be higher than 1.3
 with ratios B2B/B2W and B2B/B2S higher than 1.6, the RMS value are expected to be lower than 3
 furthermore if the ratios B2B/B2W and B2B/B2S are higher than 1.8 then the RMS values are expected to be usually lower than 2.

Another trend that is revealed by this examples is that the tube temperature RMS in a representative bay is lowered when the ratios B2B/B2W and B2B/B2S are more and more similar, preferably equal. This trend is observed for all values of the ratios.

Finally, the number of tubes or burners in the representative bays has no impact on the ratios rules. Therefore, by applying the burners ratios rules of the invention when designing a furnace, the number of burners per section can be lowered while having a good homogenization in heat transfer from the burners to the tubes.

The above results put forward design rules that need to be applied to the arrangement of the burners all along the rows in order to obtain more regular tubes temperatures all along the rows. Thanks to the observance of these rules, hot tubes—frequently observed in the center of the sections—may be avoided; failure, replacement of tubes and shutdown will therefore decrease.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A furnace for performing an endothermic process, the furnace having a set of parallel furnace walls and a set of end walls, wherein the furnace further comprises:
 tubes containing a catalyst for converting a gaseous feed, wherein the tubes are positioned in a plurality of rows inside the furnace, wherein each row of tubes is parallel with the furnace walls, wherein the plurality of rows of tubes comprises a first row of tubes, a last row of tubes, and a first inner row of tubes disposed between the first row of tubes and the last row of tubes; and
 a plurality of burners mounted in rows between each row of tubes and between the furnace walls and the first and last row of tubes, wherein the plurality of burners are mounted in parallel with the furnace walls; and
 at least one roof beam running orthogonal to the set of parallel furnace walls, wherein the at least one roof beam divides each row of burners and row of tubes thereby sections within the furnace;
 wherein the rows of burners and the rows of tubes are ended by the set of end walls and are divided into the sections with a distance from an end burner to the end wall being B2W, a distance between two adjacent burners in a common section being B2B, and half a distance in-between two adjacent sections being B2S, wherein the plurality of burners are configured such that the ratios B2B/B2W and B2B/B2S are greater than 1.3 thus limiting the occurrence of a flame merging phenomenon and reducing a quadratic mean of a tube temperature profile.

2. The furnace according to claim 1, wherein the ratios B2B/B2W and B2B/B2S are greater than 1.6.

3. The furnace according to claim 1, wherein the ratios B2B/B2W and B2B/B2S are greater than 1.8.

4. The furnace according to claim 1, wherein the ratios B2B/B2W and B2B/B2S are equals.

5. The furnace according to claim 1, wherein the burners are mounted to the furnace roof.

6. The furnace according to claim 1, wherein the burners are mounted to the floor of the furnace and fire vertically upwards.

7. The furnace according to claim 1, wherein the furnace is a steam methane reforming furnace.

8. An endothermic process to be performed in a furnace comprising tubes and burners, said process comprising:
 a) providing the furnace as claimed in claim 1;
 b) combusting fuel with air in the plurality of burners;
 c) introducing a gaseous feed and steam to the plurality of tubes under conditions effective for converting the gaseous feed and steam into products; and
 d) discharging the products at a lower end of the tubes.

9. The process according to claim 8, wherein the furnace is a steam methane reforming furnace.

10. The process according to claim 8, wherein the ratios B2B/B2W and B2B/B2S are greater than 1.6.

11. The process according to claim 8, wherein the ratios B2B/B2W and B2B/B2S are greater than 1.8.

12. The process according to claim 8, wherein the ratios B2B/B2W and B2B/B2S are equal.

13. The process according to claim 8, wherein the furnace is a top-fired furnace.

14. The process according to claim 8, wherein the furnace in a bottom-fired furnace.

* * * * *